US012777271B2

(12) United States Patent
Brown et al.

(10) Patent No.: US 12,777,271 B2
(45) Date of Patent: Oct. 27, 2026

(54) VOLTAGE DETECTION DEVICES AND SAFETY HEADWEAR COUPLING SYSTEMS

(71) Applicant: Milwaukee Electric Tool Corporation, Brookfield, WI (US)

(72) Inventors: Jesse J. Brown, Milwaukee, WI (US); Todd Andrew Zeilinger, Wauwatosa, WI (US); Samuel L. Lombardi, Milwaukee, WI (US); Brandon L. Feil, Brookfield, WI (US); Thomas S. Whitburn, Milwaukee, WI (US); Alexander S. Chirban, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/969,703

(22) Filed: Dec. 5, 2024

(65) Prior Publication Data

US 2025/0234114 A1 Jul. 17, 2025

Related U.S. Application Data

(60) Provisional application No. 63/621,330, filed on Jan. 16, 2024.

(51) Int. Cl.

| | |
|---|---|
| ***H04Q 9/00*** | (2006.01) |
| ***A42B 3/04*** | (2006.01) |
| ***G01B 7/14*** | (2006.01) |

(52) U.S. Cl.

CPC ............. *H04Q 9/00* (2013.01); *A42B 3/0406* (2013.01); *G01B 7/14* (2013.01); *H04Q 2209/30* (2013.01)

(58) Field of Classification Search

CPC ......... A42B 3/00; A42B 3/0406; A42B 3/046; H04Q 9/00; H04Q 2209/00;

(Continued)

(56) References Cited

U.S. PATENT DOCUMENTS

| | | |
|---|---|---|
| 3,309,690 A | 3/1967 | Moffitt |
| 3,774,110 A | 11/1973 | Roveti |

(Continued)

FOREIGN PATENT DOCUMENTS

| | | |
|---|---|---|
| CN | 86102149 | 3/1988 |
| CN | 87209558 | 6/1988 |

(Continued)

OTHER PUBLICATIONS

Safeguard, "Compass Pro," https://www.safeguardequipment.com/ipmag/compass-pro/, 1 page, appears to be available at least as early as Sep. 22, 2023, per Wayback Machine at: https://web.archive.org/web/20230922193502/https://www.safeguardequipment.com/ipmag/compass-pro/.

(Continued)

*Primary Examiner* — Franklin D Balseca

(74) *Attorney, Agent, or Firm* — Reinhart Boerner Van Deuren s.c.

(57) ABSTRACT

Various embodiments of a voltage detection device and of related safety systems are provided. In various embodiments, the voltage detection device is configured to couple to safety headwear and detect a distance and/or a direction to an object having an electrical current. In various embodiments the voltage detection devices detachably couple to the safety headwear.

17 Claims, 15 Drawing Sheets

(58) Field of Classification Search
CPC ........... H04Q 2209/30; H04Q 2209/40; H04Q 2209/80; H04Q 2209/84; H04Q 2209/88; G01B 7/14
See application file for complete search history.

(56) References Cited

U.S. PATENT DOCUMENTS

| | | | | |
|---|---|---|---|---|
| 3,786,468 | A | 1/1974 | Moffitt | |
| 6,329,924 | B1 * | 12/2001 | McNulty | G08B 21/182 340/552 |
| 6,897,783 | B2 | 5/2005 | Zeng et al. | |
| D622,956 | S | 9/2010 | Hoffman | |
| 8,710,979 | B2 | 4/2014 | Frederick | |
| 8,786,447 | B1 | 7/2014 | Wise | |
| 9,165,447 | B2 * | 10/2015 | Jenkins | G08B 13/2402 |
| 9,265,331 | B1 | 2/2016 | Hoffman | |
| 9,494,623 | B2 | 11/2016 | McNulty | |
| 9,494,632 | B1 | 11/2016 | McNulty | |
| 10,006,953 | B2 | 6/2018 | Rachakonda et al. | |
| 10,055,971 | B2 | 8/2018 | M R et al. | |
| 10,244,808 | B2 | 4/2019 | da Silva et al. | |
| 10,269,232 | B2 | 4/2019 | Rachakonda et al. | |
| 10,544,899 | B2 | 1/2020 | Hakins et al. | |
| 10,802,065 | B2 | 10/2020 | McNultyet al. | |
| 11,009,532 | B2 * | 5/2021 | Thompson | G01R 15/16 |
| 11,384,865 | B2 * | 7/2022 | Meola | F16L 3/243 |
| 11,579,174 | B2 | 2/2023 | Thompson et al. | |
| 11,982,403 | B2 | 5/2024 | Hakins et al. | |
| 2005/0264427 | A1 | 12/2005 | Zeng et al. | |
| 2017/0358194 | A1 | 12/2017 | Glatfelter et al. | |
| 2018/0122218 | A1 | 5/2018 | Shanley | |
| 2022/0276288 | A1 | 9/2022 | Thompson et al. | |
| 2023/0172301 | A1 | 6/2023 | Kenward et al. | |
| 2023/0341443 | A1 | 10/2023 | Thompson et al. | |
| 2023/0353974 | A1 | 11/2023 | Thompson et al. | |
| 2023/0353975 | A1 | 11/2023 | Thompson et al. | |
| 2023/0366919 | A1 * | 11/2023 | Maus | G01R 29/12 |
| 2024/0081457 | A1 | 3/2024 | Budnik et al. | |

FOREIGN PATENT DOCUMENTS

| | | |
|---|---|---|
| CN | 2128387 | 3/1993 |
| CN | 2149632 | 12/1993 |
| CN | 2169858 | 6/1994 |
| CN | 1027525 | 2/1995 |
| CN | 2329009 | 7/1999 |
| CN | 2498864 | 7/2002 |
| CN | 2504919 | 8/2002 |
| CN | 200953858 | 10/2007 |
| CN | 201097668 | 8/2008 |
| CN | 201204972 | 3/2009 |
| CN | 201328403 | 10/2009 |
| CN | 201413561 | 2/2010 |
| CN | 201426420 | 3/2010 |
| CN | 201504614 | 6/2010 |
| CN | 101766355 | 7/2010 |
| CN | 201523706 | 7/2010 |
| CN | 201700461 | 1/2011 |
| CN | 201718546 | 1/2011 |
| CN | 201743007 | 2/2011 |
| CN | 201886593 | 6/2011 |
| CN | 201976827 | 9/2011 |
| CN | 102232645 | 11/2011 |
| CN | 102283458 | 12/2011 |
| CN | 102450764 | 5/2012 |
| CN | 202211209 | 5/2012 |
| CN | 102664360 | 9/2012 |
| CN | 202471820 | 10/2012 |
| CN | 202548220 | 11/2012 |
| CN | 202635716 | 1/2013 |
| CN | 202664366 | 1/2013 |
| CN | 202819759 | 3/2013 |
| CN | 103054255 | 4/2013 |
| CN | 103141984 | 6/2013 |
| CN | 202958973 | 6/2013 |
| CN | 203182109 | 9/2013 |
| CN | 203217718 | 9/2013 |
| CN | 203219981 | 10/2013 |
| CN | 203302413 | 11/2013 |
| CN | 103462293 | 12/2013 |
| CN | 203446680 | 2/2014 |
| CN | 203590958 | 5/2014 |
| CN | 103829438 | 6/2014 |
| CN | 203643516 | 6/2014 |
| CN | 203646574 | 6/2014 |
| CN | 203786215 | 8/2014 |
| CN | 104062488 | 9/2014 |
| CN | 203838852 | 9/2014 |
| CN | 203851872 | 10/2014 |
| CN | 203897391 | 10/2014 |
| CN | 204132513 | 2/2015 |
| CN | 204157745 | 2/2015 |
| CN | 204207156 | 3/2015 |
| CN | 204245253 | 4/2015 |
| CN | 204245263 | 4/2015 |
| CN | 204302690 | 4/2015 |
| CN | 104730352 | 6/2015 |
| CN | 104856334 | 8/2015 |
| CN | 204599445 | 9/2015 |
| CN | 204599446 | 9/2015 |
| CN | 204631112 | 9/2015 |
| CN | 103514709 | 3/2016 |
| CN | 105595498 | 5/2016 |
| CN | 105639817 | 6/2016 |
| CN | 105661727 | 6/2016 |
| CN | 105809891 | 7/2016 |
| CN | 205409836 | 8/2016 |
| CN | 205512584 | 8/2016 |
| CN | 105957302 | 9/2016 |
| CN | 205547512 | 9/2016 |
| CN | 205567953 | 9/2016 |
| CN | 106037111 | 10/2016 |
| CN | 106037114 | 10/2016 |
| CN | 205621227 | 10/2016 |
| CN | 205624666 | 10/2016 |
| CN | 205624669 | 10/2016 |
| CN | 205624678 | 10/2016 |
| CN | 205624679 | 10/2016 |
| CN | 205665834 | 10/2016 |
| CN | 205788655 | 12/2016 |
| CN | 205827619 | 12/2016 |
| CN | 205831180 | 12/2016 |
| CN | 104305628 | 1/2017 |
| CN | 106418865 | 2/2017 |
| CN | 205993699 | 3/2017 |
| CN | 206025325 | 3/2017 |
| CN | 106600892 | 4/2017 |
| CN | 106690630 | 5/2017 |
| CN | 106723582 | 5/2017 |
| CN | 206165932 | 5/2017 |
| CN | 206197169 | 5/2017 |
| CN | 206238559 | 6/2017 |
| CN | 206275225 | 6/2017 |
| CN | 206284469 | 6/2017 |
| CN | 106954908 | 7/2017 |
| CN | 206294953 | 7/2017 |
| CN | 206363493 | 7/2017 |
| CN | 206390369 | 8/2017 |
| CN | 304317745 | 10/2017 |
| CN | 107319671 | 11/2017 |
| CN | 107518487 | 12/2017 |
| CN | 206699508 | 12/2017 |
| CN | 207070902 | 3/2018 |
| CN | 207097202 | 3/2018 |
| CN | 207100658 | 3/2018 |
| CN | 207100662 | 3/2018 |
| CN | 207136351 | 3/2018 |
| CN | 207164132 | 3/2018 |
| CN | 107927978 | 4/2018 |
| CN | 107927982 | 4/2018 |
| CN | 207202181 | 4/2018 |
| CN | 207269940 | 4/2018 |
| CN | 108053608 | 5/2018 |
| CN | 207380127 | 5/2018 |

(56) References Cited

FOREIGN PATENT DOCUMENTS

| | | |
|---|---|---|
| CN | 108402572 | 8/2018 |
| CN | 207764948 | 8/2018 |
| CN | 207885757 | 9/2018 |
| CN | 108685246 | 10/2018 |
| CN | 108813783 | 11/2018 |
| CN | 108877145 | 11/2018 |
| CN | 208129550 | 11/2018 |
| CN | 108968204 | 12/2018 |
| CN | 208228430 | 12/2018 |
| CN | 208259134 | 12/2018 |
| CN | 109363285 | 2/2019 |
| CN | 208446724 | 2/2019 |
| CN | 109430984 | 3/2019 |
| CN | 208607772 | 3/2019 |
| CN | 109567303 | 4/2019 |
| CN | 208821797 | 5/2019 |
| CN | 209248728 | 8/2019 |
| CN | 209268809 | 8/2019 |
| CN | 209403658 | 9/2019 |
| CN | 110313672 | 10/2019 |
| CN | 209473670 | 10/2019 |
| CN | 209527961 | 10/2019 |
| CN | 110403285 | 11/2019 |
| CN | 209628678 | 11/2019 |
| CN | 209694150 | 11/2019 |
| CN | 110522113 | 12/2019 |
| CN | 110555971 | 12/2019 |
| CN | 110771982 | 2/2020 |
| CN | 210094781 | 2/2020 |
| CN | 210539109 | 5/2020 |
| CN | 210581180 | 5/2020 |
| CN | 210642690 | 6/2020 |
| CN | 210726799 | 6/2020 |
| CN | 210747623 | 6/2020 |
| CN | 210783078 | 6/2020 |
| CN | 111358110 | 7/2020 |
| CN | 111513416 | 8/2020 |
| CN | 211154009 | 8/2020 |
| CN | 211268810 | 8/2020 |
| CN | 111685436 | 9/2020 |
| CN | 211407766 | 9/2020 |
| CN | 211722027 | 10/2020 |
| CN | 111869981 | 11/2020 |
| CN | 211979824 | 11/2020 |
| CN | 211984041 | 11/2020 |
| CN | 212137105 | 12/2020 |
| CN | 212185372 | 12/2020 |
| CN | 112293843 | 2/2021 |
| CN | 212520950 | 2/2021 |
| CN | 112471680 | 3/2021 |
| CN | 212754459 | 3/2021 |
| CN | 112602998 | 4/2021 |
| CN | 212877811 | 4/2021 |
| CN | 212938202 | 4/2021 |
| CN | 212994749 | 4/2021 |
| CN | 109380796 | 5/2021 |
| CN | 112971252 | 6/2021 |
| CN | 213549994 | 6/2021 |
| CN | 113197383 | 8/2021 |
| CN | 113367429 | 9/2021 |
| CN | 214547602 | 11/2021 |
| CN | 110169618 | 12/2021 |
| CN | 113796614 | 12/2021 |
| CN | 113826980 | 12/2021 |
| CN | 215189619 | 12/2021 |
| CN | 215189710 | 12/2021 |
| CN | 215583259 | 1/2022 |
| CN | 215775817 | 2/2022 |
| CN | 215775820 | 2/2022 |
| CN | 114267154 | 4/2022 |
| CN | 216674864 | 6/2022 |
| CN | 113080561 | 8/2022 |
| CN | 114869004 | 8/2022 |
| CN | 217471340 | 9/2022 |
| CN | 115226985 | 10/2022 |
| CN | 115251513 | 11/2022 |
| CN | 217906480 | 11/2022 |
| CN | 115420962 | 12/2022 |
| CN | 218043940 | 12/2022 |
| CN | 218073696 | 12/2022 |
| CN | 218105023 | 12/2022 |
| CN | 218298367 | 1/2023 |
| CN | 218483850 | 2/2023 |
| CN | 115880875 | 3/2023 |
| CN | 307982393 | 4/2023 |
| CN | 112471667 | 5/2023 |
| CN | 116469220 | 7/2023 |
| CN | 219460431 | 8/2023 |
| CN | 219741959 | 9/2023 |
| CN | 219939816 | 11/2023 |
| CN | 114504158 | 2/2024 |
| CN | 117582046 | 2/2024 |
| CN | 117593847 | 2/2024 |
| CN | 117612331 | 2/2024 |
| CN | 111965652 | 3/2024 |
| CN | 110179199 | 4/2024 |
| CN | 117831219 | 4/2024 |
| CN | 220752837 | 4/2024 |
| CN | 109875171 | 5/2024 |
| DE | 1942604 | 7/1966 |
| DE | 1269241 | 5/1968 |
| DE | 2418622 | 10/1975 |
| DE | 202023105654 | 12/2023 |
| EP | 1296150 | 3/2003 |
| EP | 3144686 | 3/2017 |
| EP | 3124983 | 12/2019 |
| EP | 2746784 | 12/2020 |
| WO | WO18035855 | 3/2018 |
| WO | WO19063925 | 4/2019 |
| WO | WO21119751 | 6/2021 |
| WO | WO21136678 | 7/2021 |
| WO | WO2022/039990 | 2/2022 |
| WO | WO23205098 | 10/2023 |

OTHER PUBLICATIONS

Safeguard, "Compass," https://www.safeguardequipment.com/ipmag/compass/, 1 page, appears to be available at least as early as 2016 per the Compass web page.

Greenlee, "Next Generation V-Watch Personal Voltage Detector," https://www.greenlee.com/us/en/next-generation-vwatch-personal-voltage-detector-783310081364, 3 pages, appears to be available at least as early as Jul. 2, 2022, per Wayback Machine at: https://web.archive.org/web/20220702225142/https://www.greenlee.com/us/en/next-generation-vwatch-personal-voltage-detector-783310081364.

Illumagear, "Sixth Sense by Illumagear: Personal Voltage and Current Detector," https://illumagear.com/sixth-sense/, 1 page, appears to be available at least as early as Apr. 26, 2022 per Wayback Machine at: https://web.archive.org/web/20220426172101/https://illumagear.com/sixth-sense/.

* cited by examiner

VOLTAGE DETECTION DEVICES AND SAFETY HEADWEAR COUPLING SYSTEMS

CROSS-REFERENCE TO RELATED PATENT APPLICATION

The present application claims the benefit of and priority to U.S. Provisional Application No. 63/621,330 filed on Jan. 16, 2024, which is incorporated herein by reference in its entirety.

BACKGROUND OF THE INVENTION

The present disclosure is directed generally to the field of tools and worksite safety. The present disclosure relates specifically to voltage detection devices and related safety systems for a worksite.

SUMMARY OF THE INVENTION

One embodiment of the invention relates to a safety device including a housing configured to couple to a shell of a safety headwear, a plurality of electrodes coupled to the housing including a first electrode and second electrode, a controller coupled to the housing and in electrical communication with the plurality of electrodes, and a notification device coupled to the housing and in electrical communication with the controller. The first electrode is configured to generate a first detection signal in response to detecting a nearby object having an electrical current, and the second electrode is configured to generate a second detection signal in response to detecting the nearby object having the electrical current. The controller is configured to receive the first detection signal and the second detection signal, analyze the first detection signal and the second detection signal to determine at least one of a distance to the nearby object or a direction to the nearby object, and generate a controller signal in response to analyzing the first detection signal and the second detection signal. The notification device is configured to generate an alarm in response to receiving the controller signal from the controller.

In various embodiments, the housing is configured to couple to the shell of the safety headwear, and the housing includes a body, arms extending from the body towards a person wearing the safety headwear, and tongues extending from the arms towards each other, the tongues configured to engage with the safety headwear to couple the housing to the safety headwear. In various embodiments, the housing defines a central axis that extends through a front and a rear of the housing, and each of the tongues extends from the arms towards the central axis. In various embodiments, the safety device defines an aperture that receives a projection extending from the safety headwear, and the interface between the aperture and the projection biases the safety device from being removed from the safety headwear.

In various embodiments, the plurality of electrodes include at least three electrodes, each of which are configured to generate a detection signal in response to detecting a nearby object having an electrical current. In various embodiments, the first electrode and the second electrode are circumferentially spaced in front of a person wearing the safety headwear.

In various embodiments, the alarm generated by the notification device is selected from a group consisting of a visual alarm, an audio alarm, and a haptic alarm. In various embodiments, the alarm generated by the notification device is adjusted in response to least one of ambient light and ambient sound. In various embodiments, the alarm indicates at least one of the distance to the nearby object and the direction to the nearby object. In various embodiments, the alarm indicates the distance to the nearby object.

Another embodiment of the invention relates to a safety device including a housing configured to couple to a shell of a safety headwear, a plurality of electrodes coupled to the housing, a controller coupled to the housing and in electrical communication with the plurality of electrodes, and a notification device coupled to the housing and in electrical communication with the controller. The plurality of electrodes are configured to generate one or more detection signals in response to detecting a nearby object having an electrical current. The controller is configured to receive the one or more detection signals, analyze the one or more detection signals to determine a direction to the nearby object with respect to the housing, compare the direction to a target range of directions, and generate a controller signal in response to comparing the direction to the target range of directions. The notification device is configured to generate an alarm in response to the notification device receiving the controller signal from the controller.

In various embodiments, the housing defines a central axis that extends through a front and a rear of the housing, and the housing is configured to couple to the shell of the safety headwear, the housing including a body, arms extending from the body, and tongues extending from the arms towards each other. The tongues are configured to engage with the safety headwear to couple the housing to the safety headwear, and each of the tongues extends from the arms towards the central axis. In various embodiments, the safety device interfaces with a projection extending from the safety headwear to bias the safety device from being removed from the safety headwear.

In various embodiments, the controller is configured to, in response to receiving input, toggle the target range of directions from a first range of directions to a second range of directions, wherein the second range of directions is different than the first range of directions. In various embodiments, the second range of directions is distinct from the first range of directions.

In various embodiments, the plurality of electrodes includes at least three electrodes.

Another embodiment of the invention relates to a safety device including a housing configured to couple to a shell of a safety headwear, a plurality of electrodes coupled to the housing, a controller coupled to the housing and in electrical communication with the plurality of electrodes, and a notification device coupled to the housing and in electrical communication with the controller. The plurality of electrodes are configured to generate one or more detection signals in response to detecting a nearby object having an electrical current. The controller is configured to receive the one or more detection signals, analyze the one or more detection signals to determine an estimated voltage of the electrical current, compare the estimated voltage to a threshold level of voltage., and generate a controller signal in response to comparing the estimated voltage to the threshold level of voltage. The notification device is configured to generate an alarm in response to the notification device receiving the controller signal from the controller.

In various embodiments, the housing is configured to couple to the shell of the safety headwear, and the housing includes a body, arms extending from the body, and tongues extending from the arms towards each other. The tongues are configured to engage with the safety headwear to couple the housing to the safety headwear, and each of the tongues defines a recess between the tongue and the body. In various embodiments, wherein each of the recesses defined by the tongues are configured to receive a rib extending from the safety headwear.

In various embodiments, the plurality of electrodes include at least three electrodes.

Another embodiment of the invention relates to a safety device including a housing, a plurality of electrodes, a controller and a notification device. The housing is configured to couple to a shell of a safety headwear. The plurality of electrodes are coupled to the housing, and the plurality of electrodes are configured to generate one or more detection signals in response to detecting a nearby object having a high voltage. The controller is coupled to the housing and is in electrical communication with the plurality of electrodes. The controller is configured to receive the one or more detection signals and analyze the one or more detection signals to determine at least one of a distance to the nearby object or a direction to the nearby object with respect to the housing. The controller is configured to generate a controller signal in response to analyzing the one or more detection signals. The notification device is coupled to the housing and is in electrical communication with the controller. The notification device is configured to generate an alarm in response to the notification device receiving the controller signal from the controller.

In a specific embodiment, the alarm indicates one or more of the distance to the nearby object or the direction to the nearby object with respect to the housing.

Another embodiment of the invention relates to a safety system including a hard hat and a safety device. The hard hat includes a shell formed from a rigid material, and a pair of ribs extending from the shell away from each other at a front of the hard hat. The safety device includes a housing, a plurality of electrodes, a controller, and a notification device. The housing includes a pair of tongues extending towards each other, the pair of tongues engaging with the pair of ribs to slidably and detachably couple the housing and the shell. The plurality of electrodes are coupled to the housing, and the plurality of electrodes are configured to generate one or more detection signals in response to detecting a nearby object having a high voltage. The controller is coupled to the housing and is in electrical communication with the plurality of electrodes. The controller is configured to receive the one or more detection signals and analyze the one or more detection signals to detect the nearby object having the high voltage. The controller is configured to generate a controller signal in response to analyzing the one or more detection signals. The notification device is coupled to the housing and is in electrical communication with the controller. The notification device is configured to generate an alarm in response to the notification device receiving the controller signal from the controller.

In a specific embodiment, the hard hat includes a protrusion extending outward from the shell between the pair of ribs, and the safety device includes a locking platform slidably engaged with the housing. The locking platform slidably actuates between a locked position in which the locking platform interfaces with the protrusion to bias the pair of tongues from disengaging from the pair of ribs, and an unlocked position in which the locking platform does not bias the pair of tongues from disengaging from the pair of ribs.

In a specific embodiment, the hard hat includes a protrusion extending outward from the shell between the pair of ribs, and the safety device includes a locking platform rotatably engaged with the housing. The locking platform rotatably actuates between a locked position in which the locking platform interfaces with the protrusion to bias the pair of tongues from disengaging from the pair of ribs, and an unlocked position in which the locking platform does not bias the pair of tongues from disengaging from the pair of ribs.

Additional features and advantages will be set forth in the detailed description which follows, and will be readily apparent to those skilled in the art from the description or recognized by practicing the embodiments as described in the written description and/or shown in the accompany drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments. In addition, alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of voltage detection devices and related safety systems are provided. One or more of the systems and devices described herein are directed at improving safety in working environments, such as by detecting objects having a voltage, such as a high voltage. Various embodiments described herein integrate with other objects being worn by workers, such as safety headwear, to provide warnings and/or signals indicating when the worker is near an object including a high voltage.

Applicant has developed safety devices that couple to safety headwear. In an exemplary embodiment, the safety devices detachably couple to a front of the safety headwear and detect a distance to an object including a high voltage and/or a direction to the object including a high voltage. The safety device includes one or more notification devices that notify the user of the object, such as by detecting a threat's existence, direction, location, and/or strength, and notifying the user of the same.

Figure 1:
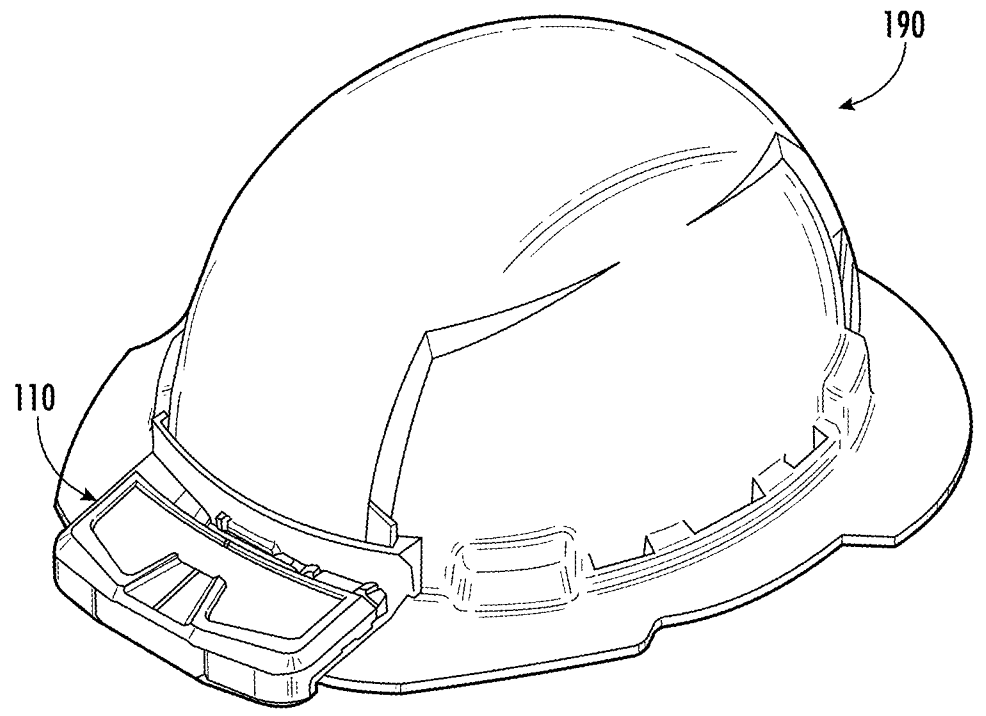
FIG. 1 depicts a safety device coupled to a safety headwear, according to an exemplary embodiment.
Figure 2:
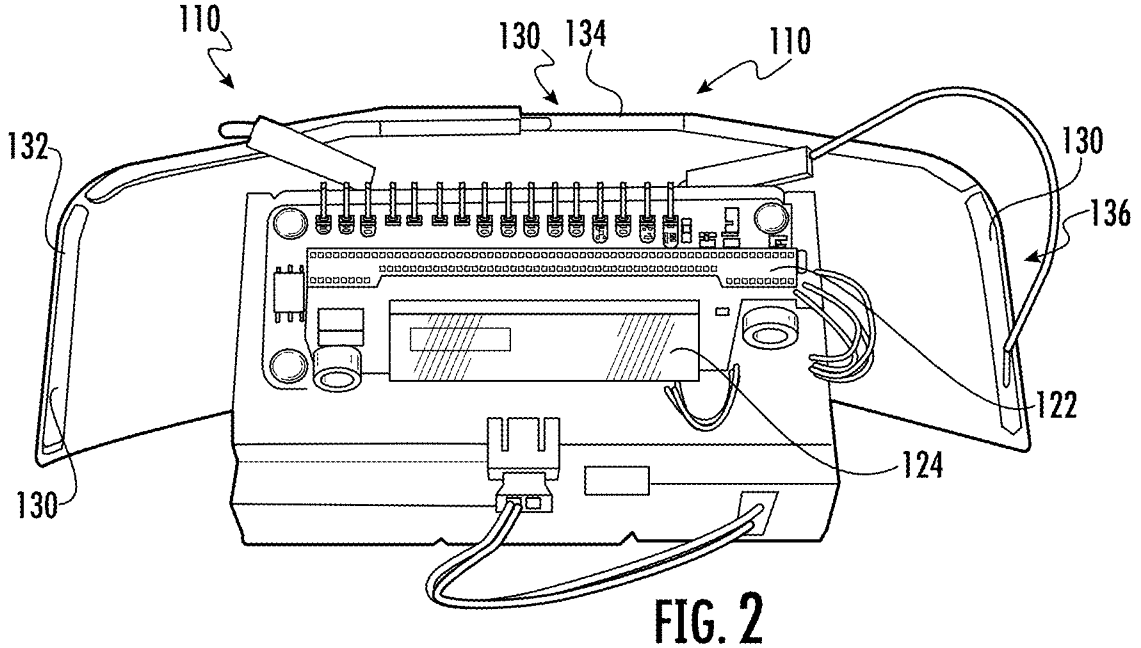
FIG. 2 depicts a portion of the safety device of FIG. 1, according to an exemplary embodiment.

Referring to FIGS. 1-2, various aspects of safety device 110 are shown. Safety device 110 includes a housing, electrodes 130, a controller 122, and a notification device 124. The housing is configured to couple safety device 110 to a shell of a safety headwear. In various embodiments, the housing of safety device 110 is the same or similar as the housing for other safety devices described herein, such as housing 212 of safety device 210.

In various embodiments, safety device 110 includes a plurality of electrodes 130 coupled to the housing. The electrodes 130 are coupled to the housing, and the electrodes 130 are configured to generate one or more detection signals in response to detecting a nearby object having a voltage, such as a high voltage. In various embodiments the electrodes 130 include one or more of left electrode 132, central electrode 134, and right electrode 136. In various embodiments, plurality of electrodes includes a first electrode (e.g., left electrode 132) and a second electrode (e.g., right electrode 136). The first electrode is configured to generate a first detection signal in response to detecting a nearby object having an electrical current, and the second electrode is configured to generate a second detection signal in response to detecting the nearby object having the electrical current.

In various embodiments, the plurality of electrodes 130 include at least three electrodes (e.g., left electrode 132, central electrode 134, and right electrode 136), each of which are configured to generate a detection signal in response to detecting a nearby object having an electrical current. In various embodiments, the first electrode (e.g., left electrode 132) and the second electrode (e.g., right electrode 136) are circumferentially spaced in front of a person wearing the safety headwear (e.g., safety headwear 190).

The controller 122 is coupled to the housing and is in electrical communication with the electrodes 130. The controller 122 is configured to receive the one or more detection signals from the electrodes 130 (e.g., the first detection signal and the second detection signal), analyze the one or more detection signals (e.g., the first detection signal and the second detection signal) to determine at least one of a distance to the nearby object or a direction to the nearby object with respect to the housing, and generate a controller signal in response to analyzing the one or more detection signals (e.g., the first detection signal and the second detection signal).

In various embodiments, the controller 122 is configured to analyze the one or more detection signals to determine a direction to the nearby object with respect to the housing, compare the direction to a target range of directions (e.g., range 142 in FIG. 6, range 140 in FIG. 6, range 144 in FIG. 7, range 144 and range 146 collectively in FIG. 7), and generate a controller signal in response to comparing the direction to the target range of directions. As one example, if the target range of directions is range 144 in FIG. 7, the controller 122 determines if the direction of the nearby object is within range 144, and if so then generate the controller signal. As another example, if the target range of directions is the combination of range 144 and range 146 in FIG. 7, the controller 122 determines if the direction of the nearby object is within range 144 or range 146, and if so then generate the controller signal.

In various embodiments, the controller 122 is configured to, in response to receiving input, toggle the target range of directions from a first range of directions (e.g., range 144) to a second range of directions (e.g., range 144 plus range 146 plus range 148), wherein the second range of directions is different than the first range of directions. In various embodiments, the second range of directions is distinct from the first range of directions (e.g., the second range is range 144 and the first range is range 148, and range 144 is distinct from range 148).

The notification device 124 is coupled to the housing and is in electrical communication with the controller 122. The notification device 124 is configured to generate an alarm in response to the notification device 124 receiving the controller signal from the controller 122. The alarm indicates one or more of the distance to the nearby object or the direction to the nearby object with respect to the housing. In various embodiments, the direction to the nearby object is determined by identifying which of the ranges, described in more detail below, includes the nearby object. In various embodiments, the alarm is selected from a group consisting of a visual alarm (e.g., via a screen, or via emitting light(s)), notification device 124 generating sound(s), and haptics (e.g., vibrations). In various embodiments, safety device 110 detects ambient light and/or sound around safety device 110 to determine the appropriate brightness and/or volume of the alarm so that the user will notice the alarm (e.g., if the area is loud, any audio alerts are very loud; or if the area is bright, any visual alerts are very bright).

In various embodiments, the alarm generated by the notification device 124 is selected from a group consisting of a visual alarm, an audio alarm, and a haptic alarm. In various embodiments, the alarm generated by the notification device 124 is adjusted in response to least one of ambient light and ambient sound, such as by increasing the brightness in response to detecting a relatively large amount of ambient light and/or increasing the volume in response to detecting a relatively large amount of ambient sound. In various embodiments, the alarm indicates at least one of the distance to the nearby object and the direction to the nearby object. In various embodiments, the alarm indicates the distance to the nearby object.

Figure 3:
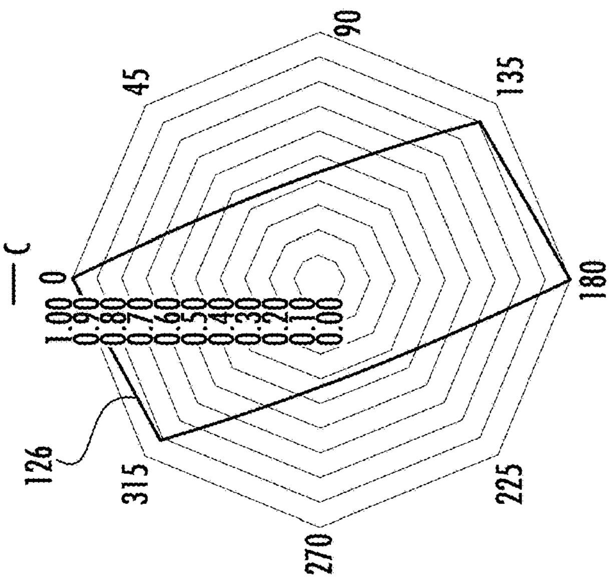
FIG. 3 depicts an exemplary detection range using one or more of the electrodes of the safety device of FIG. 1, according to an exemplary embodiment.
Figure 4:
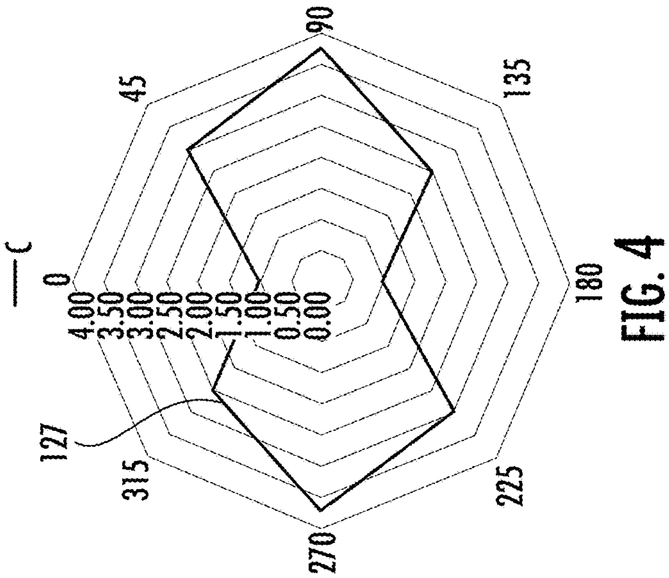
FIG. 4 depicts an exemplary detection range using one or more of the electrodes of the safety device of FIG. 1, according to an exemplary embodiment.
Figure 5:
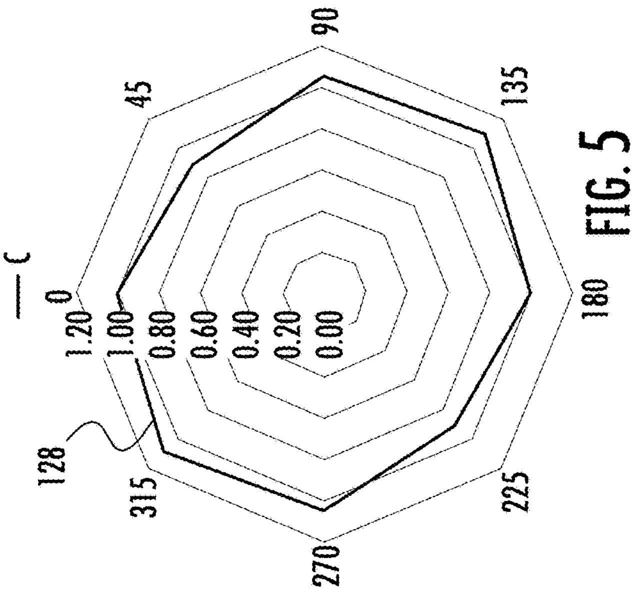
FIG. 5 depicts an exemplary detection range using one or more of the electrodes of the safety device of FIG. 1, according to an exemplary embodiment.

Referring to FIGS. 3-5, various aspects of safety device 110 detecting a nearby high voltage are shown. FIG. 3 depicts an exemplary detection range 126 where safety device 110 is only using the central electrode 134. As will be observed, the range 126 shown in FIG. 3 extends from the user generally forward (e.g., towards the "0" direction) and backwards (e.g., towards the "180" direction). FIG. 4 depicts an exemplary detection range 127 where safety device 110 is only using the left electrode 132 and right electrode 136. As will be observed, the range 127 shown in FIG. 4 extends from the user generally to the left (e.g., towards the "270" direction) and to the right (e.g., towards the "90" direction). FIG. 5 depicts an exemplary detection range 128 where safety device 110 is using central electrode 134 as well as left electrode 132 and right electrode 136. As will be observed, the range 128 shown in FIG. 5 extends from the user circumferentially around the user, thereby providing a detection range that detects generally equally well in all directions.

Figure 6:
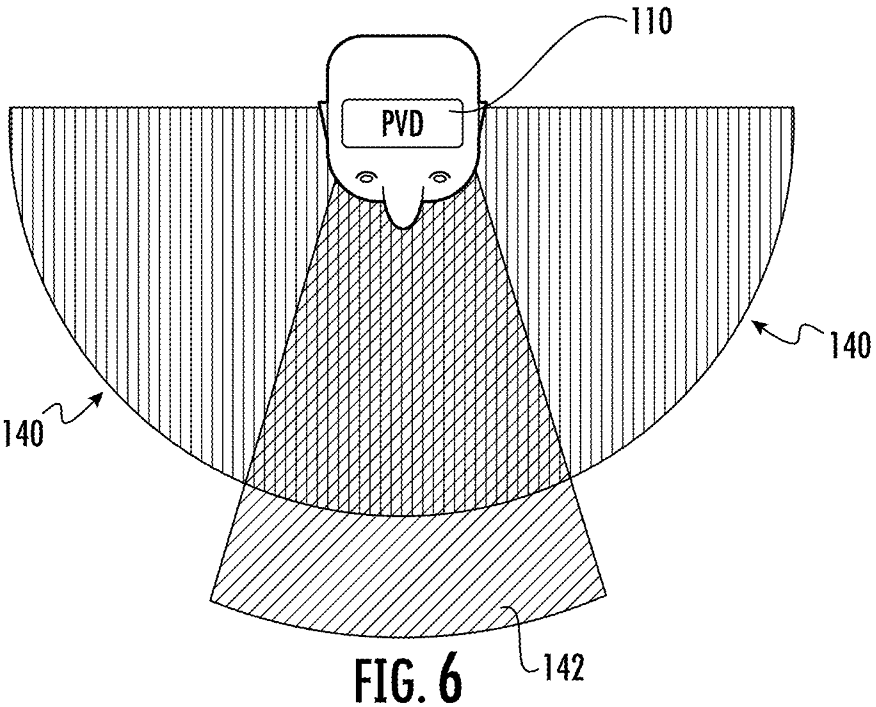
FIG. 6 is a top view of ranges of the safety device of FIG. 1, according to an exemplary embodiment.
Figure 7:
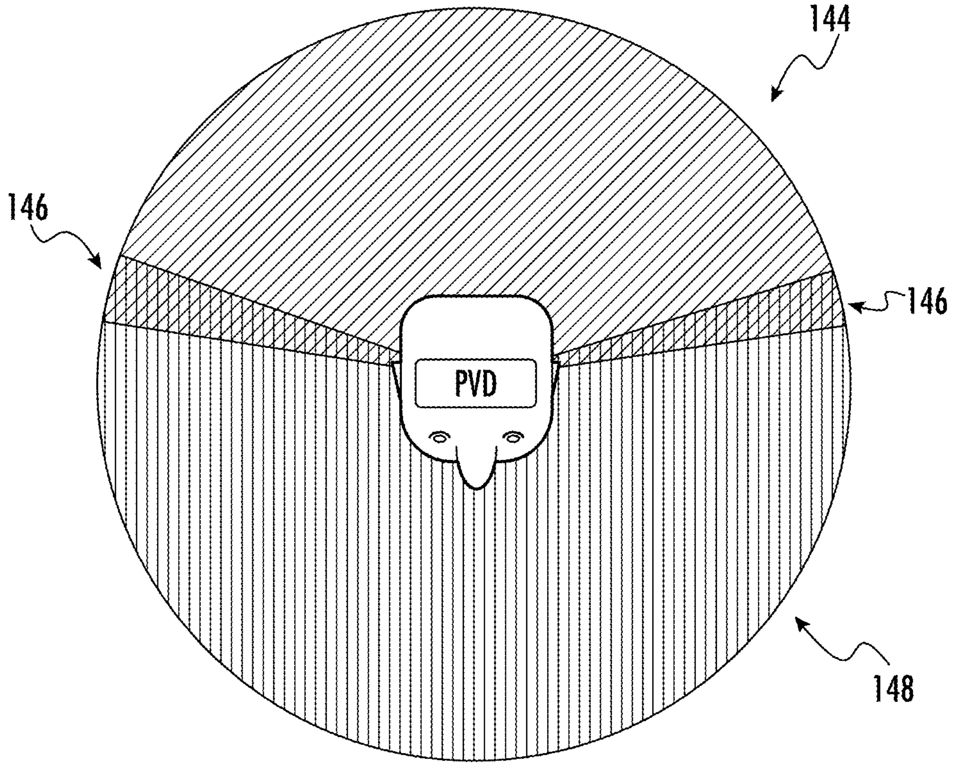
FIG. 7 is a top view of ranges of the safety device of FIG. 1, according to an exemplary embodiment.
Figure 8:
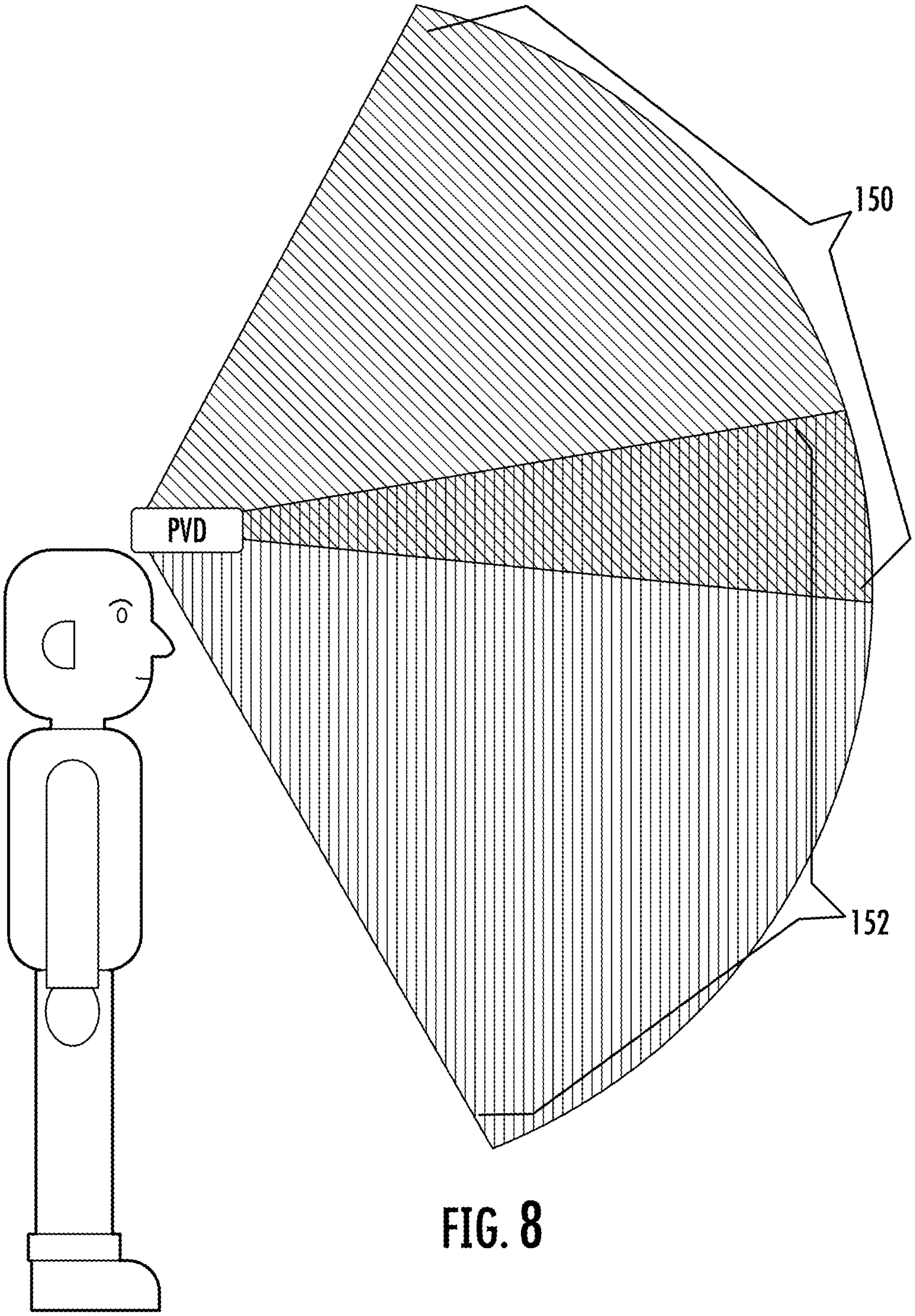
FIG. 8 is a side view of ranges of the safety device of FIG. 1, according to an exemplary embodiment.

Referring to FIGS. 6-8, various aspects of safety device 110 detecting a nearby high voltage are shown. Referring to FIG. 6, in various embodiments safety device 110 utilizes one or more electrodes 130 to detect the existence of an object with a high voltage in range 140, and safety device 110 utilizes one or more electrodes 130 to detect an object in range 142. Thus, the user can toggle between using safety device 110 to provide warnings about the existence of objects with a high voltage (e.g., using range 140) and/or using safety device 110 to identify the location of objects with a high voltage using a narrow beam of sensitivity (e.g., using range 142).

In various embodiments, controller 122 is configured to analyze the one or more detection signals to determine an estimated voltage of the electrical current, compare the estimated voltage to a threshold level of voltage, and generate a controller signal in response to comparing the estimated voltage to the threshold level of voltage.

Referring to FIG. 7, in various embodiments safety device 110 utilizes one or more electrodes 130, such as a large electrode, to detect the existence of an object with a high voltage in range 144 in addition to ranges 146, 148.

Referring to FIG. 8, in various embodiments safety device 110 utilizes one or more electrodes 130 to detect the existence of an object with a high voltage in upper range 150 and/or lower range 152. In use, the user can toggle safety device 110 to only provide alerts when an object having a high voltage is in (1) upper range 150, (2) lower range 152, and/or (3) both upper range 150 and lower range 152. In this way, the user can configure the safety device 110 to only send alerts for fallen power lines (e.g., lines within lower range 152) and ignore power lines in upper range 150 above the user, thereby facilitating the user finding downed power lines without having to ignore alerts for lines the user is not concerned with (e.g., power lines that are not downed).

Figure 9:
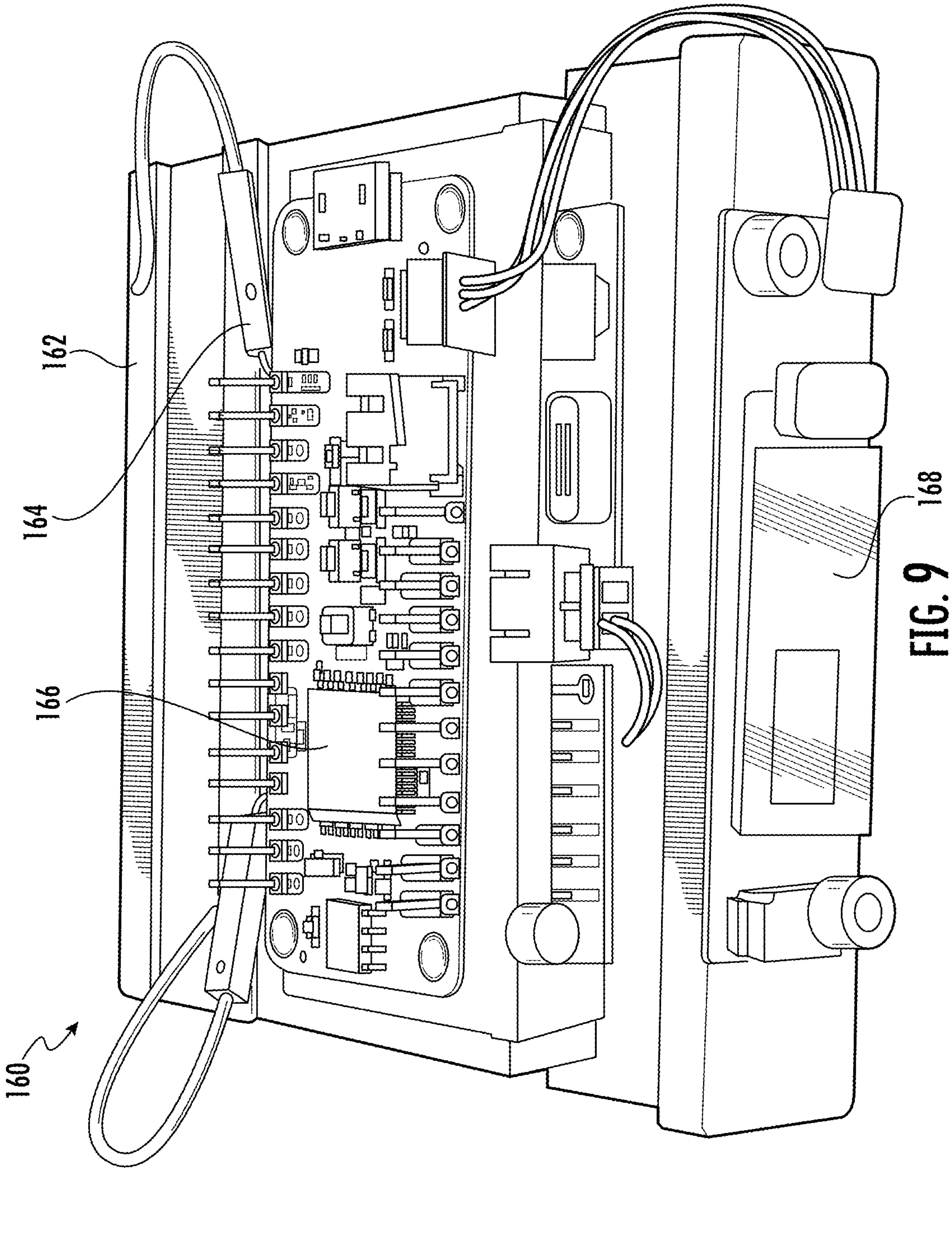
FIG. 9 depicts a portion of another safety device, according to an exemplary embodiment.
Figure 10:
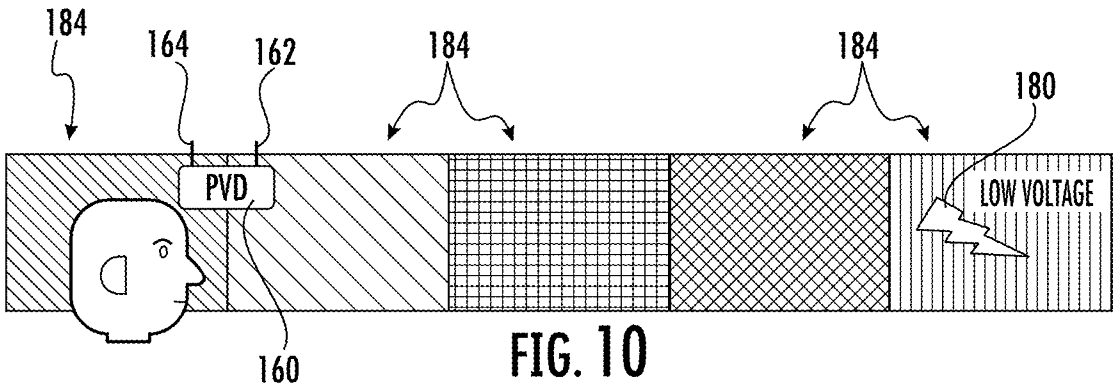
FIG. 10 is a side view of a range of the safety device of FIG. 9, according to an exemplary embodiment.
Figure 11:
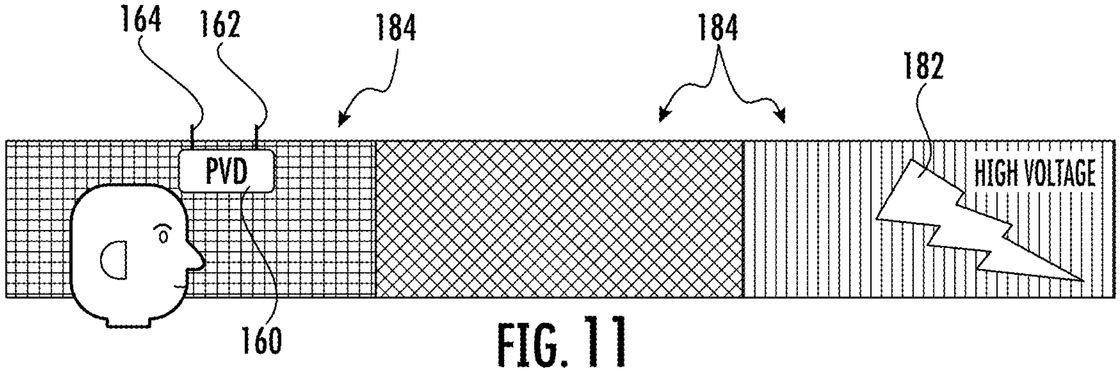
FIG. 11 is a side view of a range of the safety device of FIG. 9, according to an exemplary embodiment.

Referring to FIGS. 9-11, safety device 160 is shown according to an exemplary embodiment. Safety device 160 is substantially the same as safety device 110 except for the differences discussed herein.

In particular, safety device 160 includes a front electrode 162 and a back electrode 164. The processor 166 receives signals from front electrode 162 and back electrode 164 and analyzes the signals to determine a strength of the high voltage being detected. Based on that analysis, the processor 166 determines whether to send a signal to the notification device(s) 168 to alert the user.

Referring to FIGS. 10-11, various aspects are shown of the strengths 184 of the electro-magnetic signal emitted by low voltage 180 and high voltage 182. Referring to FIG. 10, if front electrode 162 and back electrode 164 are detecting the same or a similar strength 184, safety device 160 can determine that the detected voltage is low voltage 180. Referring to FIG. 11, if front electrode 162 and back electrode 164 are detecting different strengths 184 (e.g., a difference above a predetermined threshold), safety device 160 can determine that the detected voltage is high voltage 182 and therefore alert the user to the danger.

Figure 12:
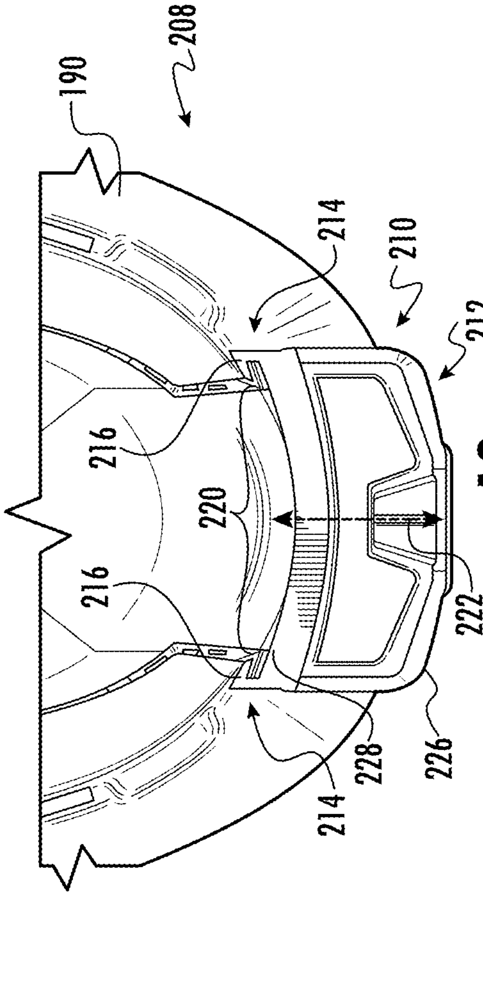
FIG. 12 is a top view of another safety device, according to an exemplary embodiment.
Figure 13:
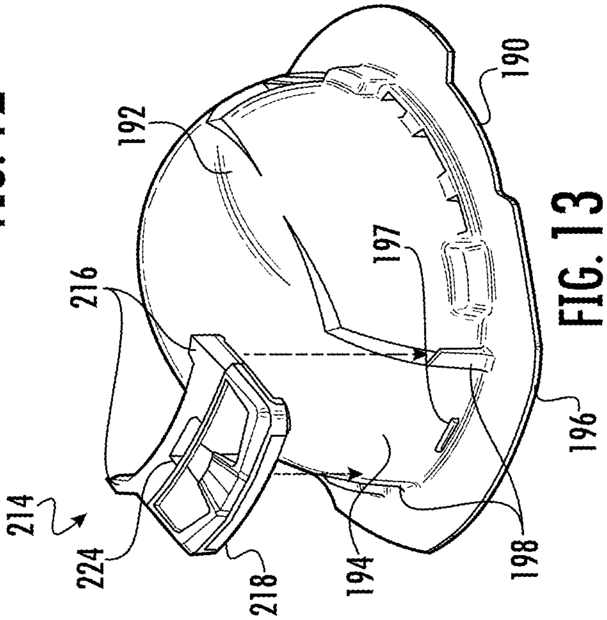
FIG. 13 is a perspective view of the safety device of FIG. 12, according to an exemplary embodiment.
Figure 14:
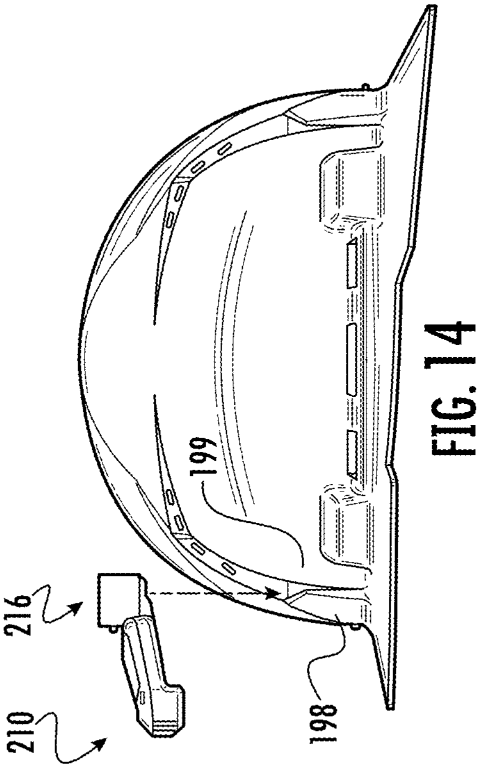
FIG. 14 is a side view of the safety device of FIG. 12, according to an exemplary embodiment.
Figure 15:
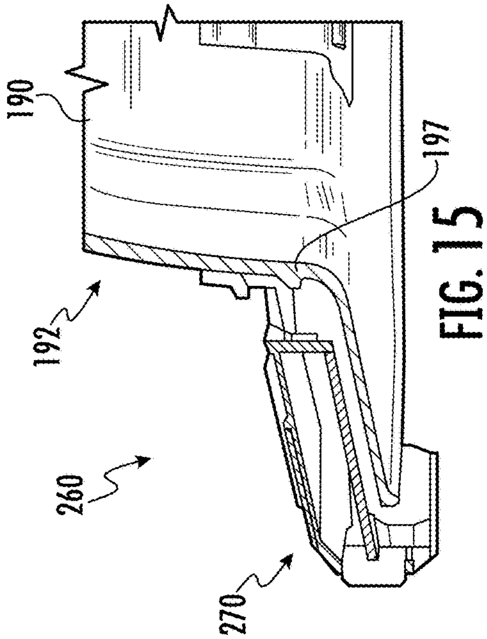
FIG. 15 is a cross-section view of another safety device, according to an exemplary embodiment.
Figure 16:
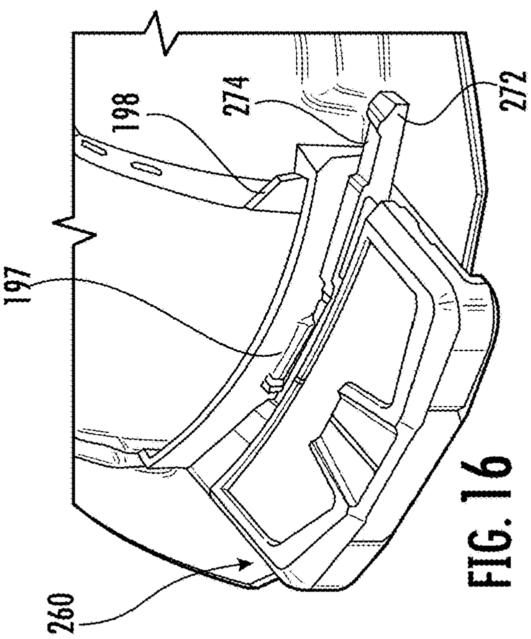
FIG. 16 is a perspective view of the safety device of FIG. 15, according to an exemplary embodiment.
Figure 17:
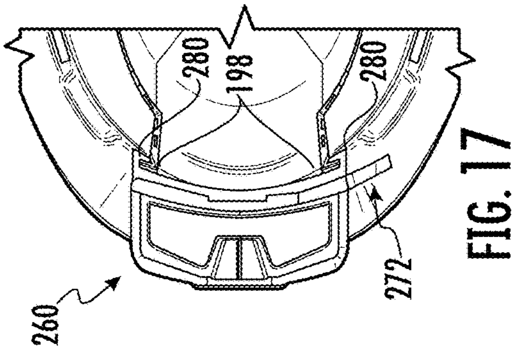
FIG. 17 is a top view of the safety device of FIG. 15, according to an exemplary embodiment.
Figure 18:
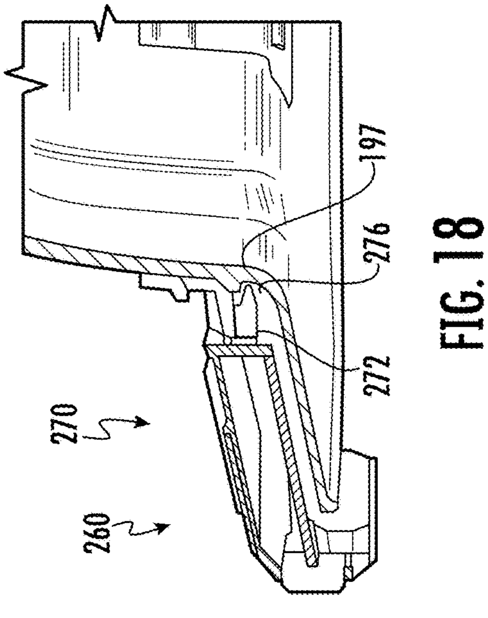
FIG. 18 is a cross-section view of the safety device of FIG. 15, according to an exemplary embodiment.

Referring to FIGS. 12-14, safety system 208 including safety device 210 is shown according to an exemplary embodiment. Safety device 210 is substantially the same as safety device 110 or safety device 160 except for the differences discussed herein. In particular, safety device 210 includes housing 212 configured to couple to a shell of a safety headwear, the housing 212 including a body 218, arms 214 extending from body 218 towards a person wearing the safety headwear that safety device 210 is coupled to, such as backwards, and tongues 216 extending from arms 214 towards each other, the tongues 216 configured to engage with the safety headwear (e.g., safety headwear 190) to couple the housing 212 to the safety headwear, each of the tongues 216 defines a recess 220 between the tongue 216 and the body 218. In various embodiments, each of the recesses 220 defined by the tongues 216 are configured to receive a rib 198 extending from the safety headwear 190.

In various embodiments, housing 212 defines a central axis 222 that extends through a front 226 and a rear 228 of the housing 212, and each of the tongues 216 extends from the arms 214 towards the central axis 222. In various embodiments, safety device defines an aperture 224 that receives a projection 197 extending from the safety headwear 190, and the interface between the aperture 224 and the projection 197 biases the safety device 210 from being removed from the safety headwear 190.

In a specific embodiment, safety system 208 includes safety headwear 190 and safety device 210. Safety headwear 190 includes a shell 192 formed from a rigid material, and a pair of ribs 198 extending from the shell 192 away from each other at a front 194 of the safety headwear 190. In various embodiments, ribs 198 extend upward away from brim 196 of safety headwear 190 thereby defining channels 199 between ribs 198 and front 194 of safety headwear 190. Safety device 210 includes housing 212 including a pair of tongues 216 extending towards each other, the pair of tongues 216 engaging with the pair of ribs 198 to slidably and detachably couple the housing 212 and the shell 192.

Referring to FIGS. 15-21, safety device 260 is shown according to an exemplary embodiment. Safety device 260 is substantially the same as safety device 110, safety device 160 or safety device 210 except for the differences discussed herein.

In various embodiments safety headwear 190 includes projection 197 extending outward (e.g., forward) from shell 192 between the pair of ribs 198. Safety device 260 includes housing 270, and locking platform 272 slidably engaged with housing 270. Locking platform 272 includes interface projection 274 extending upward and configured to facilitate a user engaging locking platform 272 to slide locking platform 272 with respect to housing 212, and locking projection 276 that selectively engages with projection 197 to bias the pair of tongues 280 from sliding upward to disengage from the pair of ribs 198.

Figure 19:
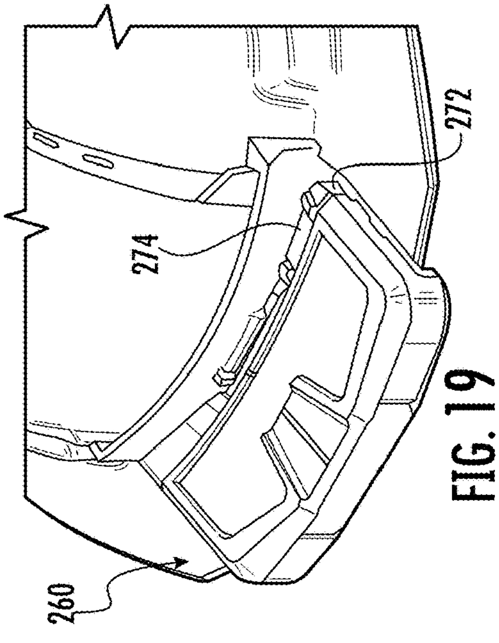
FIG. 19 is a perspective view of the safety device of FIG. 15, according to an exemplary embodiment.
Figure 20:
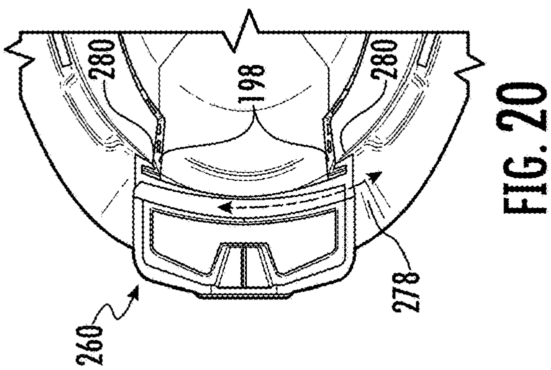
FIG. 20 is a top view of the safety device of FIG. 15, according to an exemplary embodiment.
Figure 21:
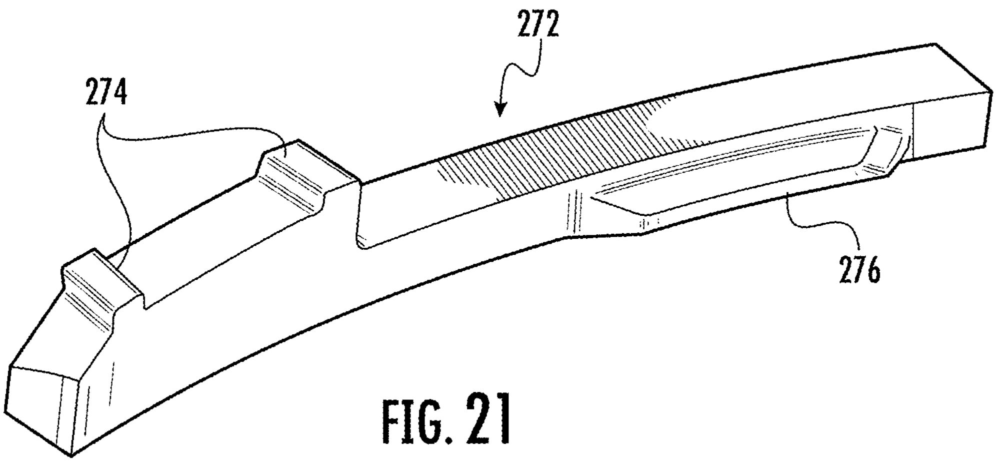
FIG. 21 is a perspective view of a portion of the safety device of FIG. 15, according to an exemplary embodiment.

Locking platform 272 slidably actuates with respect to housing 270 along axis 278 between a locked position (FIGS. 18-20) in which the locking platform 272 (e.g., locking projection 276 of locking platform 272) interfaces with projection 197 to bias the pair of tongues 280 from disengaging from the pair of ribs 198, and an unlocked position (FIGS. 15-17) in which the locking platform 272 does not interface with projection 197 to bias the pair of tongues 280 from sliding upward to disengage from the pair of ribs 198. When locking platform 272 is in the locked position (FIGS. 18-20), in various embodiments locking platform 272 is seamlessly aligned with housing 270 so that locking platform 272 does not extend outside housing 270 (FIG. 19).

Referring to FIGS. 22-29, safety device 310 is shown according to an exemplary embodiment. Safety device 310 is substantially the same as safety device 110, safety device 160, safety device 210, or safety device 260 except for the differences discussed herein.

Locking platform 320 slides with respect to housing 312 along axis 318. Locking platform 320 includes an upper plate 322 and a lower plate 330 coupled to upper plate 322, such as pivotally coupled.

Figure 22:
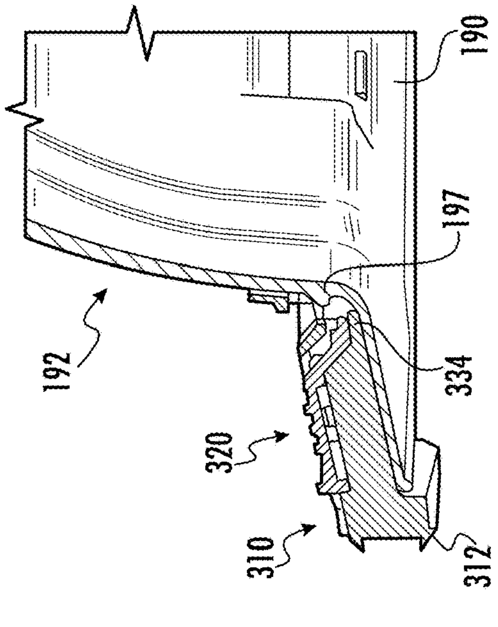
FIG. 22 is a cross-section view of another safety device, according to an exemplary embodiment.
Figure 23:
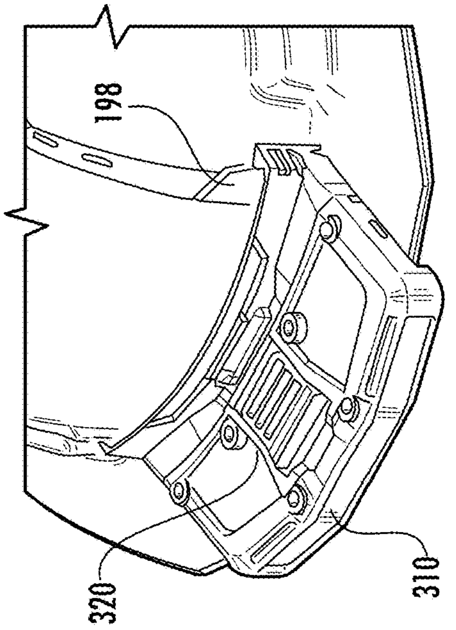
FIG. 23 is a perspective view of the safety device of FIG. 22, according to an exemplary embodiment.
Figure 24:
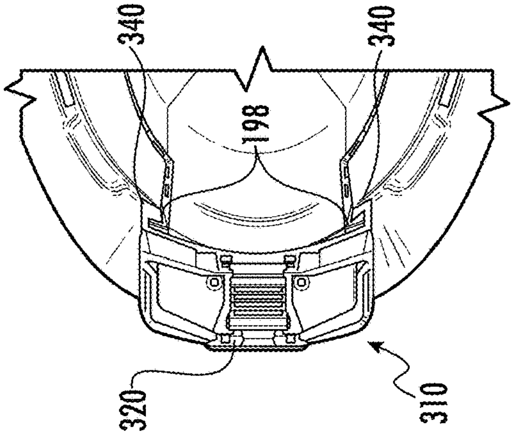
FIG. 24 is a top view of the safety device of FIG. 22, according to an exemplary embodiment.
Figure 25:
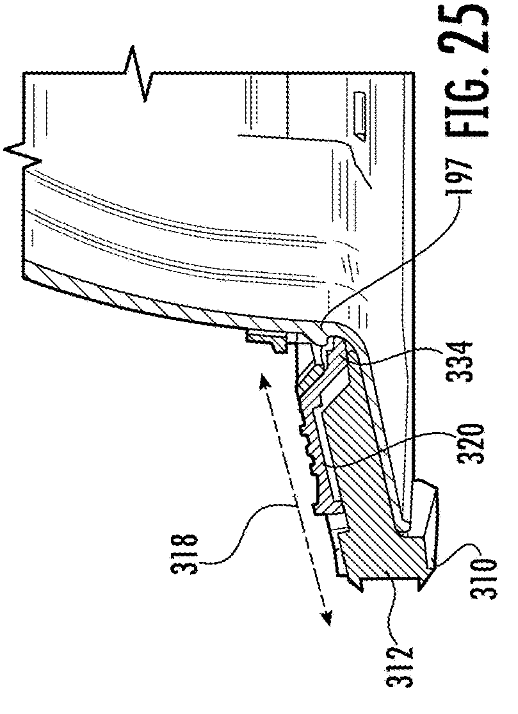
FIG. 25 is a cross-section view of the safety device of FIG. 22, according to an exemplary embodiment.
Figure 26:
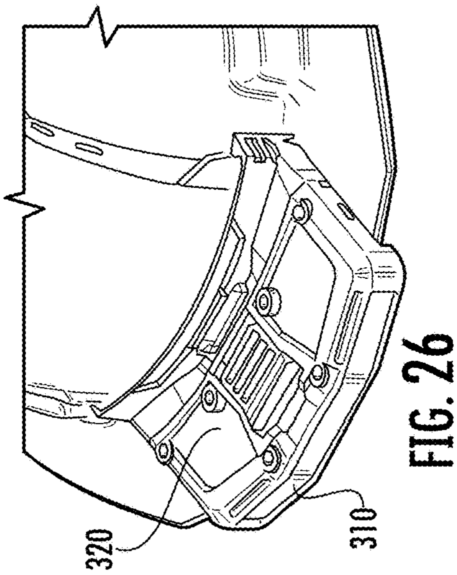
FIG. 26 is a perspective view of the safety device of FIG. 22, according to an exemplary embodiment.
Figure 27:
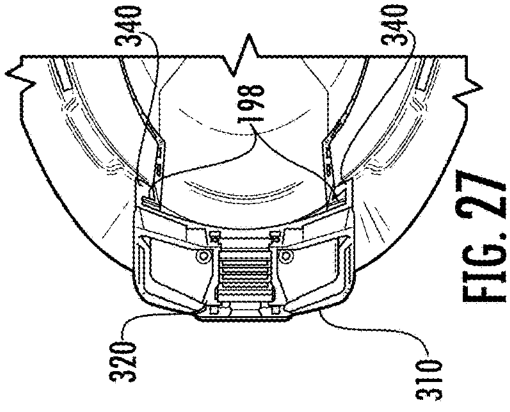
FIG. 27 is a top view of the safety device of FIG. 22, according to an exemplary embodiment.

Locking platform 320 includes interface projection 324 extending upward and configured to facilitate a user engaging locking platform 320 to slide locking platform 320 with respect to housing 312, and locking projection 334 that selectively engages with projection 197 to bias the pair of tongues 340 from being slid upward to disengage from the pair of ribs 198. FIGS. 25-27 show locking platform 320 in the locked position, and FIGS. 22-24 show locking platform 320 in the unlocked position.

Figure 28:
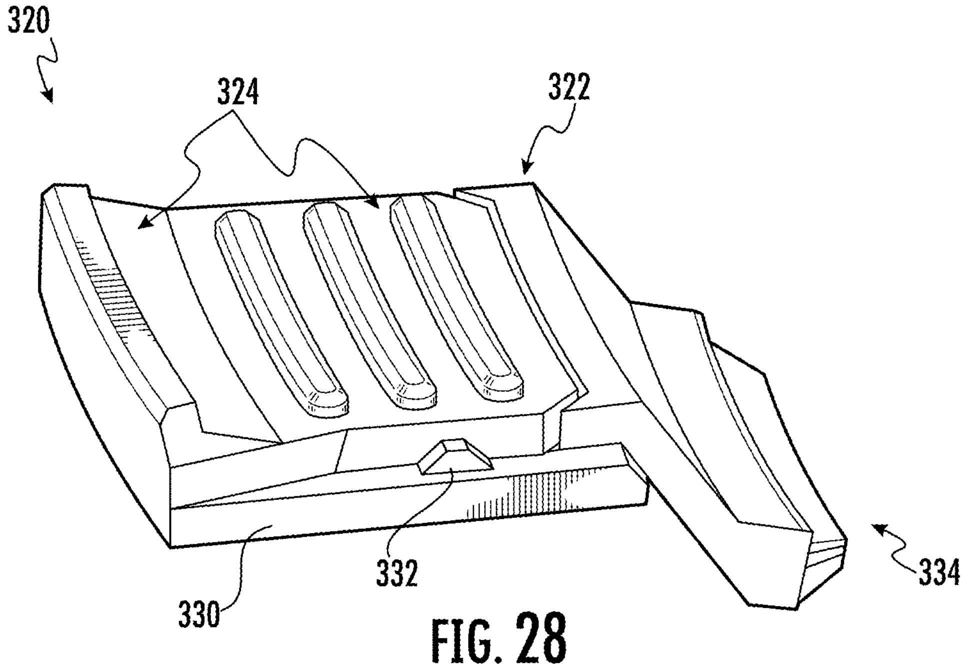
FIG. 28 is a perspective view of a portion of the safety device of FIG. 22, according to an exemplary embodiment.
Figure 29:
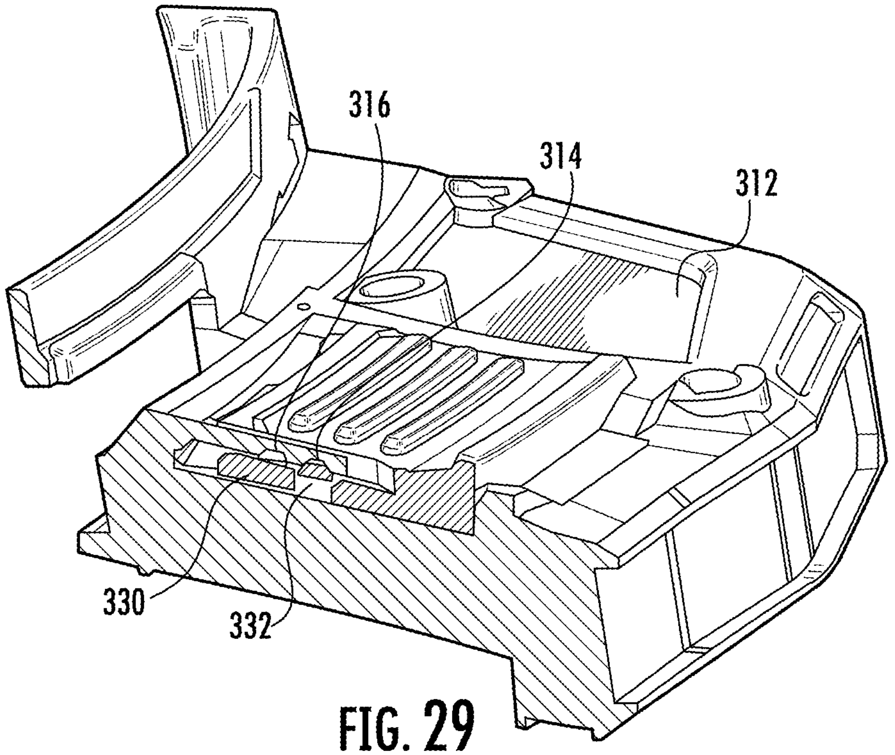
FIG. 29 is a cross-section view of the safety device of FIG. 22, according to an exemplary embodiment.

Referring to FIGS. 28-29, locking platform 320 includes projection 332 that extends upward from lower plate 330. In various embodiments, locking platform 320 includes first recess 314 and second recess 316 that each receive projection 332. First recess 314 receives projection 332 when locking platform 320 is in the unlocked position (FIGS. 22-24), and second recess 316 receives projection 332 when locking platform 320 is in the locked position (FIGS. 25-27). The engagement between projection 332 and first recess 314 biases locking platform 320 from sliding out of the unlocked position, and the engagement between projection 332 and second recess 316 biases locking platform 320 from sliding out of the locked position.

Referring to FIGS. 30-36, safety device 410 is shown according to an exemplary embodiment. Safety device 410 is substantially the same as safety device 110, safety device 160, safety device 210, safety device 260, or safety device 310 except for the differences discussed herein.

Locking platform 420 rotates with respect to housing 412 around axis 418. Locking platform 420 includes an upper plate 422 and a lower plate 430 coupled to upper plate 322.

Figure 32:
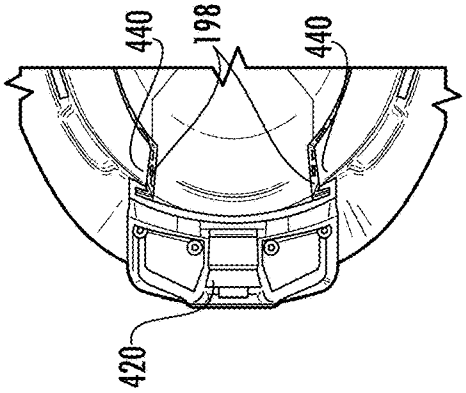
FIG. 32 is a top view of the safety device of FIG. 30, according to an exemplary embodiment.
Figure 35:
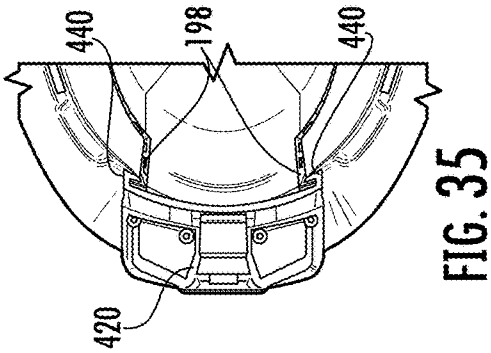
FIG. 35 is a top view of the safety device of FIG. 30, according to an exemplary embodiment.
Figure 31:
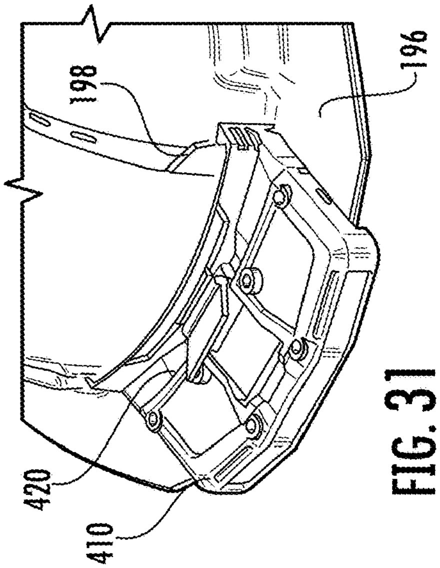
FIG. 31 is a perspective view of the safety device of FIG. 30, according to an exemplary embodiment.
Figure 34:
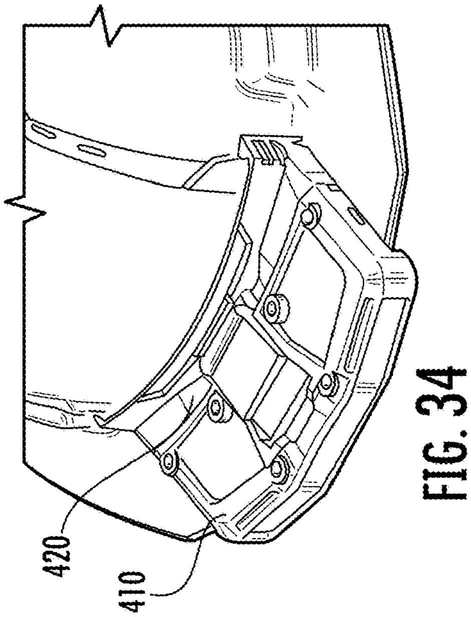
FIG. 34 is a perspective view of the safety device of FIG. 30, according to an exemplary embodiment.
Figure 30:
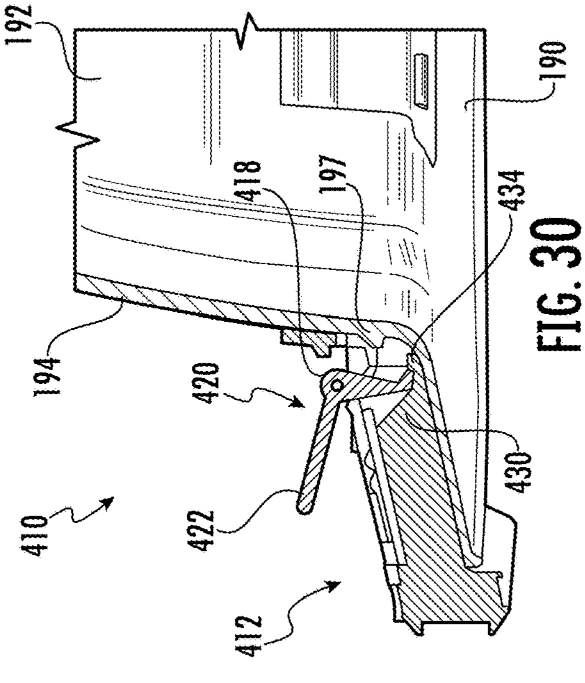
FIG. 30 is a cross-section view of another safety device, according to an exemplary embodiment.
Figure 33:
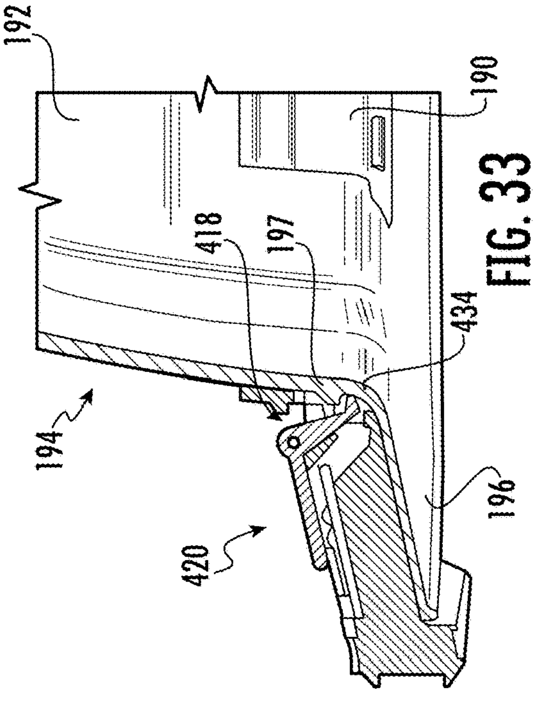
FIG. 33 is a cross-section view of the safety device of FIG. 30, according to an exemplary embodiment.
Figure 36:
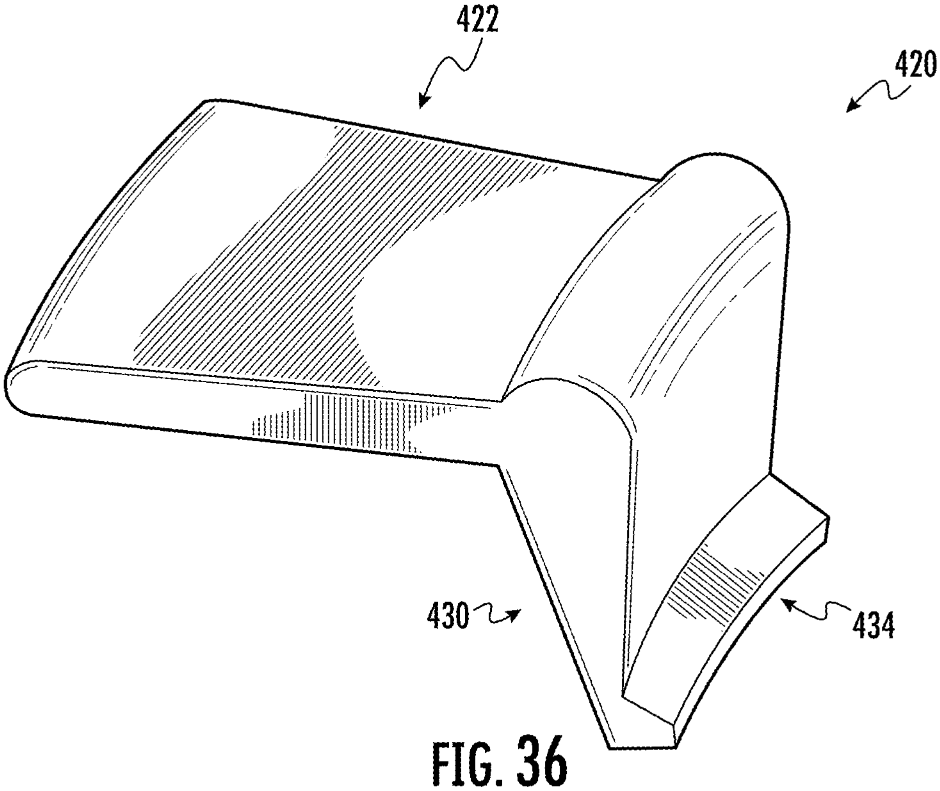
FIG. 36 is a perspective view of a portion of the safety device of FIG. 30, according to an exemplary embodiment.

Locking platform 420 includes upper plate 422 to facilitate a user engaging locking platform 420 to rotate locking platform 420 with respect to housing 412, and locking projection 434 that selectively engages with projection 197 to bias the pair of tongues 440 from sliding upward to disengage from the pair of ribs 198. FIGS. 33-35 depict locking platform 420 in the locked position, and FIGS. 30-32 depict locking platform in the unlocked position.

Figure 37:
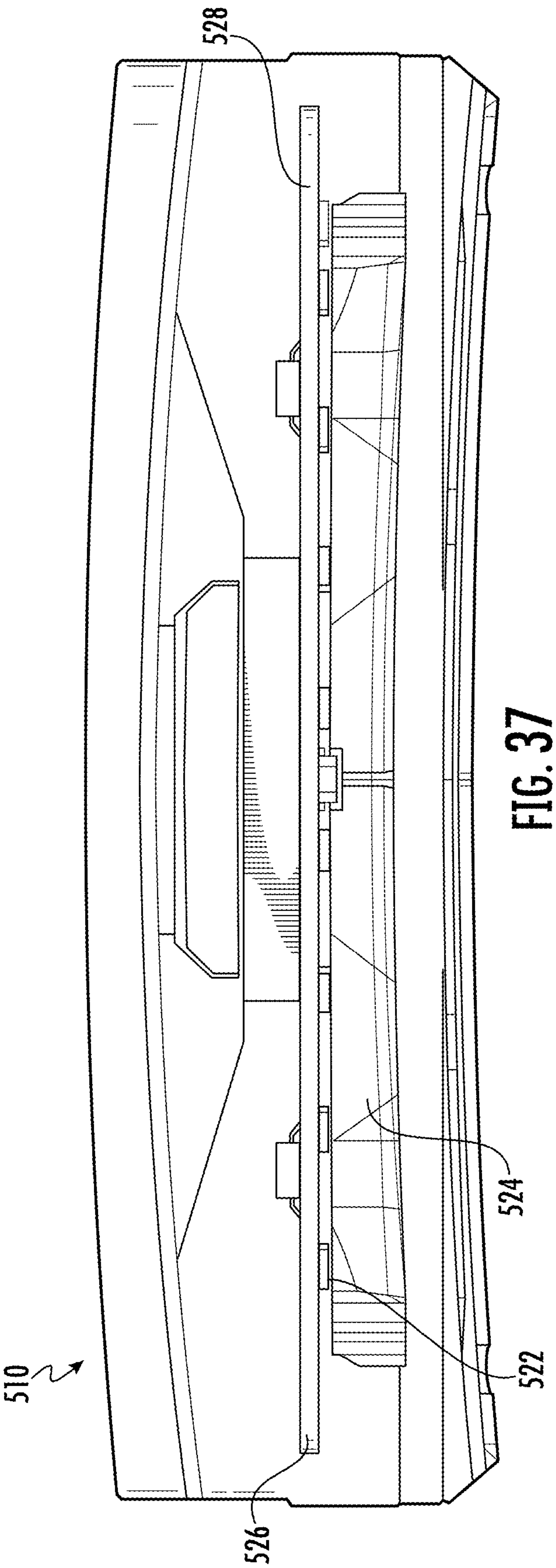
FIG. 37 is a front view of a portion of another safety device, according to an exemplary embodiment.
Figure 38:
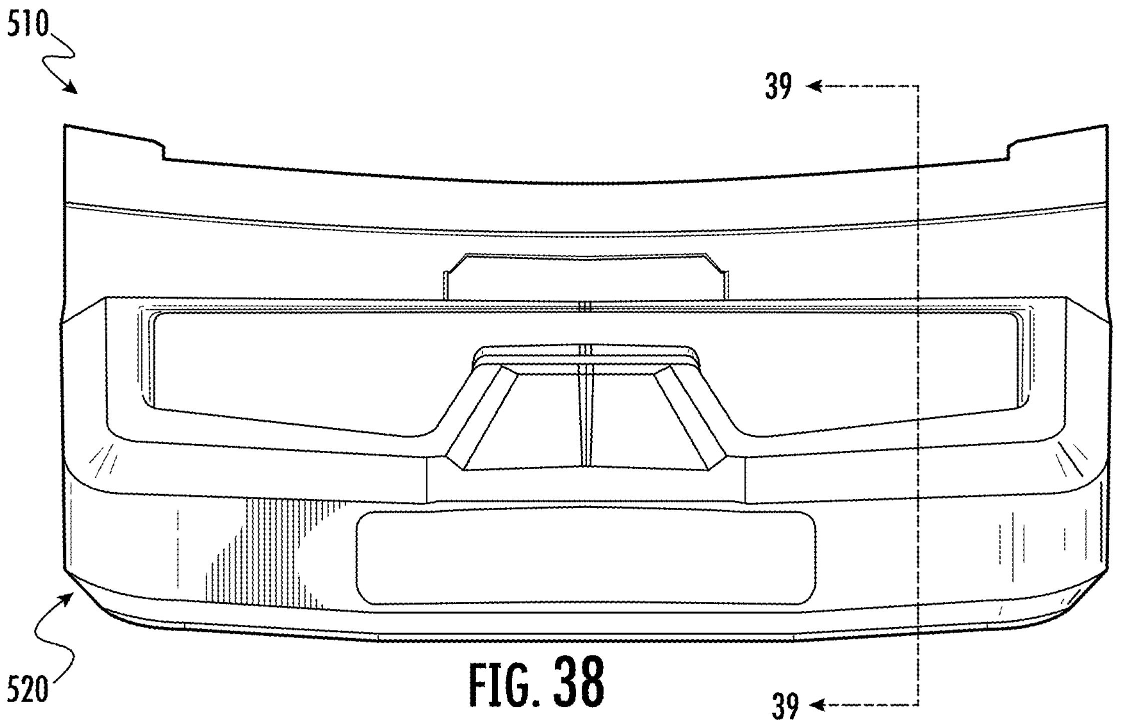
FIG. 38 is a front view from above of the safety device of FIG. 37, according to an exemplary embodiment.
Figure 39:
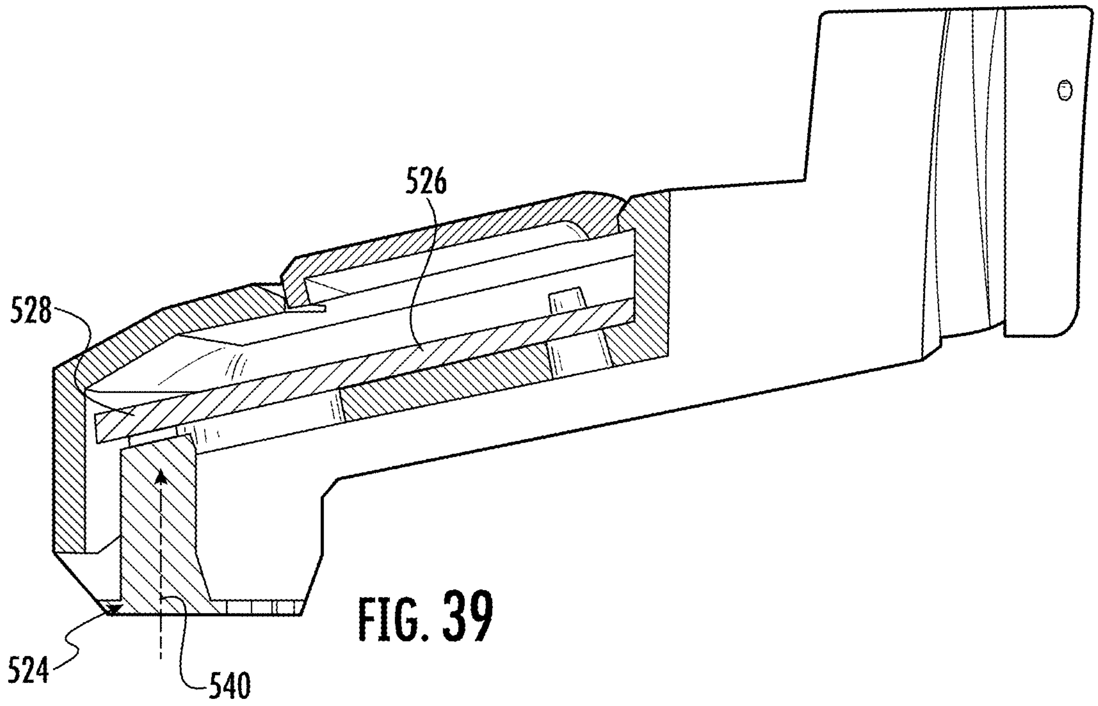
FIG. 39 is a cross-section view of the safety device of FIG. 38 taken along line 39-39 in FIG. 38, according to an exemplary embodiment.

Referring to FIGS. 37-39, safety device 510 is shown according to an exemplary embodiment. Safety device 510 is substantially the same as safety device 110, safety device 160, safety device 210, safety device 260, safety device 310, or safety device 410 except for the differences discussed herein.

Safety device 510 includes housing 520, one or more light emitting units 522, such as LEDs, a light pipe 524 that provides visual communication for light passing through light pipe 524, a control board 526, and one or more light sensors 528. In use, light pipe 524 propagates light in at least two directions. In particular, light pipe 524 propagates received light 540 through light pipe 524 to light sensors 528, and light pipe 524 propagates light emitted by light emitting units 522 out of housing 520.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature. As used herein, "rigidly coupled" refers to two components being coupled in a manner such that the components move together in a fixed positional relationship when acted upon by a force.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A safety device comprising:
- a housing configured to couple to a shell of a safety headwear;
- a plurality of electrodes coupled to the housing, the plurality of electrodes configured to generate two or more detection signals in response to detecting a nearby object having an electrical current, the plurality of electrodes comprising a first electrode and second electrode, the two or more detection signals including a first detection signal and a second detection signal, the first electrode configured to generate the first detection signal in response to detecting the nearby object having the electrical current, and the second electrode configured to generate the second detection signal in response to detecting the nearby object having the electrical current;
- a controller coupled to the housing and in electrical communication with the plurality of electrodes, the controller configured to:
  - receive the two or more detections signals;
  - analyze the two or more detections signals to determine a distance to the nearby object and a direction to the nearby object with respect to the housing;
  - receive an input selecting a target range of directions;
  - compare the direction to the nearby object to the target range of directions; and
  - generate a controller signal in response to comparing the direction to the nearby object to the target range of directions; and
- a notification device coupled to the housing and in electrical communication with the controller, the notification device configured to generate an alarm in response to receiving the controller signal from the controller, wherein the alarm indicates the distance to the nearby object.

2. The safety device of claim 1, the housing configured to couple to the shell of the safety headwear comprising:
- a body;
- arms extending from the body towards a person wearing the safety headwear; and
- tongues extending from the arms towards each other, the tongues configured to engage with the safety headwear to couple the housing to the safety headwear.

3. The safety device of claim 2, the housing defining a central axis that extends through a front and a rear of the housing, wherein each of the tongues extends from the arms towards the central axis.

4. The safety device of claim 3, the safety device defining an aperture that receives a projection extending from the safety headwear, wherein an interface between the aperture and the projection biases the safety device from being removed from the safety headwear.

5. The safety device of claim 1, the plurality of electrodes comprising at least three electrodes, each of which are configured to generate a detection signal in response to detecting a nearby object having an electrical current.

6. The safety device of claim 1, wherein the first electrode and the second electrode are circumferentially spaced in front of a person wearing the safety headwear.

7. The safety device of claim 1, wherein the alarm generated by the notification device is selected from a group consisting of a visual alarm, an audio alarm, and a haptic alarm.

8. The safety device of claim 7, wherein the alarm generated by the notification device is adjusted in response to at least one of ambient light and ambient sound.

9. A safety device comprising:
- a housing configured to couple to a shell of a safety headwear;
- a plurality of electrodes coupled to the housing, the plurality of electrodes configured to generate one or more detection signals in response to detecting a nearby object having an electrical current;
- a controller coupled to the housing and in electrical communication with the plurality of electrodes, the controller configured to:
  - receive the one or more detection signals;
  - analyze the one or more detection signals to determine a direction to the nearby object with respect to the housing;

in response to receiving input, toggle a target range of directions from a first range of directions to a second range of directions, wherein the second range of directions is different than the first range of directions;

compare the direction to the second range of directions; and generate a controller signal in response to comparing the direction to the nearby object to the target range of directions; and a notification device coupled to the housing and in electrical communication with the controller, the notification device configured to generate an alarm in response to the notification device receiving the controller signal from the controller.

10. The safety device of claim 9, the housing defining a central axis that extends through a front and a rear of the housing, the housing configured to couple to the shell of the safety headwear comprising:

a body;

arms extending from the body; and tongues extending from the arms towards each other, the tongues configured to engage with the safety headwear to couple the housing to the safety headwear, wherein each of the tongues extends from the arms towards the central axis.

11. The safety device of claim 10, the safety device interfacing with a projection extending from the safety headwear to bias the safety device from being removed from the safety headwear.

12. The safety device of claim 9, wherein the second range of directions does not overlap with the first range of directions.

13. The safety device of claim 9, the plurality of electrodes comprising at least three electrodes.

14. A safety device comprising:

a housing configured to couple to a shell of a safety headwear;

a plurality of electrodes coupled to the housing, the plurality of electrodes configured to generate one or more detection signals in response to detecting a nearby object having an electrical current;

a controller coupled to the housing and in electrical communication with the plurality of electrodes, the controller configured to:

receive the one or more detection signals;

analyze the one or more detection signals to determine a direction to the nearby object with respect to the housing;

receive an input selecting a target range of directions;

compare the direction to the nearby object to the target range of directions; and generate a controller signal in response to comparing the direction to the nearby object to the target range of directions; and a notification device coupled to the housing and in electrical communication with the controller, the notification device configured to generate an alarm in response to the notification device receiving the controller signal from the controller.

15. The safety device of claim 14, the housing configured to couple to the shell of the safety headwear comprising:

a body;

arms extending from the body; and tongues extending from the arms towards each other, the tongues configured to engage with the safety headwear to couple the housing to the safety headwear, wherein each of the tongues defines a recess between the tongue and the body.

16. The safety device of claim 15, wherein each of the recesses defined by the tongues are configured to receive a rib extending from the safety headwear.

17. The safety device of claim 14, the plurality of electrodes comprising at least three electrodes.

* * * * *